(12) United States Patent
Martin et al.

(10) Patent No.: US 7,870,207 B2
(45) Date of Patent: Jan. 11, 2011

(54) METHOD AND APPARATUS FOR EFFICIENT POLLING

(75) Inventors: Daryl Martin, Paradise (CA); Ahmed E. Hassan, Waterloo (CA); Ahmed Sadek, Oakville (CA)

(73) Assignee: Research In Motion Limited, Waterloo, Ontario (CA)

( * ) Notice: Subject to any disclaimer, the term of this patent is extended or adjusted under 35 U.S.C. 154(b) by 717 days.

(21) Appl. No.: 11/614,227

(22) Filed: Dec. 21, 2006

(65) Prior Publication Data

US 2008/0155028 A1    Jun. 26, 2008

(51) Int. Cl.
  G06F 15/16    (2006.01)
(52) U.S. Cl. .................. 709/206; 709/201; 709/203
(58) Field of Classification Search .......... 709/201, 709/203, 206
  See application file for complete search history.

(56) References Cited

U.S. PATENT DOCUMENTS

| | | | | |
|---|---|---|---|---|
| 7,289,495 | B2 * | 10/2007 | Roy | 370/381 |
| 2001/0034769 | A1 * | 10/2001 | Rast | 709/206 |
| 2003/0229717 | A1 * | 12/2003 | Teague | 709/246 |
| 2005/0164703 | A1 * | 7/2005 | Huynh | 455/432.3 |
| 2005/0171996 | A1 | 8/2005 | Gorty et al. | |

FOREIGN PATENT DOCUMENTS

EP    1557987 A1    7/2005

OTHER PUBLICATIONS

Foster et al., "Method for Reducing Polling Traffic within a Mailbox Communication System", Research Disclosure Journal, ISSN 0374-4353, Apr. 2003.*
Extended European Search Report issued on May 29, 2007 in connection with corresponding application EP06126943.7.
Ward, Foster et al, A Method for Reducing Polling Traffic Within a Mailbox Communication System, Research Disclosure, Mason Publications, Hampshire, GB, Apr. 2003, p. 2XP007132506, vol. 468, No. 64.

* cited by examiner

*Primary Examiner*—Joon H Hwang
*Assistant Examiner*—Thomas Lee
(74) *Attorney, Agent, or Firm*—Ridout & Maybee LLP (57) ABSTRACT

An e-mail distribution server may manage many pull e-mail accounts by periodically, as defined by an interval time, polling associated pull e-mail servers for new mail. If the e-mail distribution server receives an e-mail message destined for a recipient having a pull e-mail account managed by the e-mail distribution server, the e-mail distribution server may recognize an opportunity to poll the pull e-mail server associated with the pull e-mail account sooner than the expiration of the interval time.

14 Claims, 8 Drawing Sheets

METHOD AND APPARATUS FOR EFFICIENT POLLING

FIELD

The present application relates generally to distribution of e-mail messages to mail user agents and, more specifically, to polling an e-mail server to determine whether there are new e-mail messages.

BACKGROUND

A popular system for providing e-mail messages to mobile wireless communication devices is a push e-mail system. That is, a system where a Mail Delivery Agent (MDA) sends (or pushes) newly received e-mail messages to a Mail User Agent (MUA). An MUA (or e-mail client) is a computer program that is used to read, compose and send e-mail messages.

Historically, the MDA is software that accepts incoming e-mail messages and distributes each e-mail message to a mailbox of the recipient. Such distribution was particularly straightforward when the mailboxes resided on the same computing device that executed the MDA software. The distribution became more complex as the mailboxes were distributed to storage on other computing devices networked to the computing device that executed the MDA software. More recently, complexity of distribution increased as recipient mailboxes, and MUA software, were placed on mobile wireless communication devices. A popular push e-mail system for mobile devices uses wireless MUA devices and a push e-mail server attached to a traditional e-mail system. The push e-mail server monitors the e-mail server and, when the push e-mail server identifies a new e-mail message for a user of a wireless MUA device, the push e-mail server retrieves a copy of the new e-mail message and pushes the new e-mail message to the wireless MUA device over the wireless network.

Competition for the push system for providing e-mail messages to mobile wireless communication devices is provided by a pull e-mail system. In a pull e-mail system, the MUA polls the MDA at intervals to determine whether there are new e-mail messages and, if so, downloads the new e-mail messages. The known Post Office Protocol version 3 (POP3) is a popular example of a pull-based mail delivery protocol. In contrast to pull e-mail, most of the protocols used in popular current systems of push e-mail are proprietary.

While pull e-mail may have initially been considered better suited to wireless e-mail message delivery, due to wireless data devices not always being available to receive e-mail, certain aspects of push e-mail systems has made push e-mail systems very popular. For instance, where users of wireless data service networks are charged by the kilobit, each time the wireless data device polled the pull e-mail server, the charges to the user would increase. Additionally, polling the server when no e-mail messages are present may be seen as wasting the energy stored in the battery of the wireless data device. However, it appears that the instantaneous nature of e-mail message delivery in push e-mail systems has been the primary factor in increasing the popularity of push e-mail systems.

Efforts to reduce, in a pull e-mail system, the delay between the arrival of an e-mail message at the e-mail server and the arrival of the e-mail message at the wireless device, minimization of which delay is a feature of push e-mail systems, have largely centered around reducing the polling interval. That is, increasing the frequency with which the wireless MUA device polls the MDA to see if there are new e-mail messages. However, as discussed above, an increased frequency of polling is known to detrimentally result in an increase in network traffic that is costly to the user and wasteful of battery life.

BRIEF DESCRIPTION OF THE DRAWINGS

Reference will now be made to the drawings, which show, by way of example, embodiments and in which.

DETAILED DESCRIPTION OF THE EMBODIMENTS

Upon receiving an e-mail message destined for a recipient having a pull e-mail account managed by an e-mail distribution server, the e-mail distribution server may recognize an opportunity to poll the pull e-mail server associated with the pull e-mail account sooner than the expiration of the interval time.

In accordance with an aspect of the present application, there is provided a method of handling an outgoing mail message. The method includes managing a pull e-mail account for a first mail user agent, where the managing involves periodically polling a pull e-mail server to determine whether new e-mail messages have been received by the pull e-mail server, where the new e-mail messages specify an address associated with the pull e-mail account. The method further includes receiving an outgoing e-mail message from a second mail user agent and determining whether the outgoing e-mail message specifies, as a recipient, the address associated with the pull e-mail account. The method further includes, where the outgoing e-mail message specifies, as a recipient, the address associated with the pull e-mail account, triggering an interruption of the managing and, responsive to the interruption, polling the pull e-mail server. In addition, a mail distribution server with a processor adapted to carry out this method is provided along with a computer readable medium for adapting a processor to carry out the method.

In accordance with another aspect of the present application, there is provided, at an e-mail distribution server, a method of handling an outgoing mail message. The method includes receiving an outgoing e-mail message and, responsive to determining that a recipient e-mail address specified in the outgoing e-mail message is associated with a pull e-mail account managed by the e-mail distribution server, triggering an interruption of management of the pull e-mail account. In addition, a mail distribution server with a processor adapted to carry out this method is provided along with a computer readable medium for adapting a processor to carry out the method.

In accordance with a further aspect of the present application, there is provided a method of managing an incoming mail message. The method includes managing a first pull e-mail account for a first mail user agent, where the managing involves periodically polling a first pull e-mail server to determine whether new e-mail messages have been received by the first pull e-mail server, where the new e-mail messages specify an address associated with the first pull e-mail account, managing a second pull e-mail account for a second mail user agent, receiving, from the first pull e-mail server and responsive to the polling, an incoming e-mail message and determining whether the incoming e-mail message specifies, as a recipient, an address associated with the second pull e-mail account. The method further includes, where the incoming e-mail message specifies, as a recipient, the address associated with the second pull e-mail account, triggering an interruption of the managing the second pull e-mail account and, responsive to the interruption, polling the second pull e-mail server.

In accordance with a further aspect of the present application, there is provided a method of handling an outgoing mail message. The method includes maintaining a record associating a manager of a pull e-mail account for a first mail user agent with an address associated with the pull e-mail account, where the manager periodically polls a pull e-mail server to determine whether new e-mail messages have been received by the pull e-mail server, where the new e-mail messages specify the address associated with the pull e-mail account. The method further includes receiving an outgoing e-mail message from a second mail user agent and determining whether the outgoing e-mail message specifies, as a recipient, the address associated with the pull e-mail account. The method also includes, where the outgoing e-mail message specifies, as a recipient, the address associated with the pull e-mail account, triggering an interruption of the managing and, responsive to the interruption, transmitting a message to manager of the pull e-mail account.

Other aspects and features of the present application will become apparent to those of ordinary skill in the art upon review of the following description of specific embodiments in conjunction with the accompanying figures.

Figure 1:
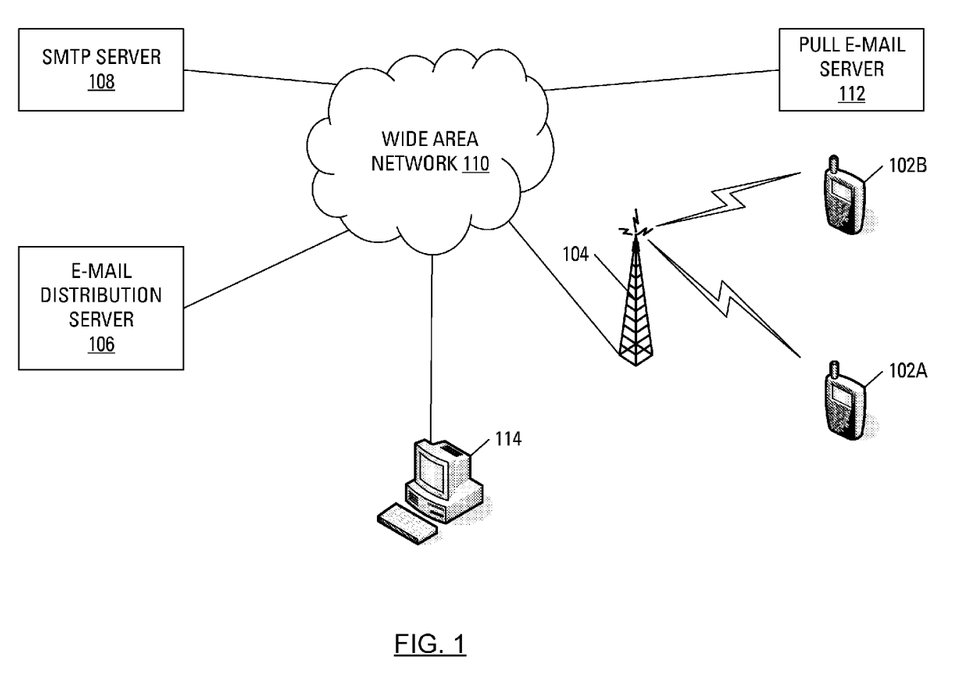
FIG. 1 illustrates an exemplary wireless e-mail distribution system including an e-mail distribution server.

FIG. 1 illustrates an exemplary wireless e-mail distribution system. In particular, a first mobile communication device 102A and a second mobile communication device 102B are illustrated in a wireless connection with a wireless carrier network 104. The wireless carrier network 104 is connected to an e-mail distribution server 106, which, in turn, is connected to a wide area network 110. The wide area network 110 may be considered to be representative of the present-day Internet or a successor network. Also connected to the wide area network 110 is a pull e-mail server 112, a Simple Mail Transfer Protocol (SMTP) server 108 and a Personal Computer (PC) 114.

The wireless carrier network 104 may be designed to operate as a Mobitex™, DataTAC™ or General Packet Radio Service (GPRS) mobile data communication network and may also be designed to operate as any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc.

Figure 2:
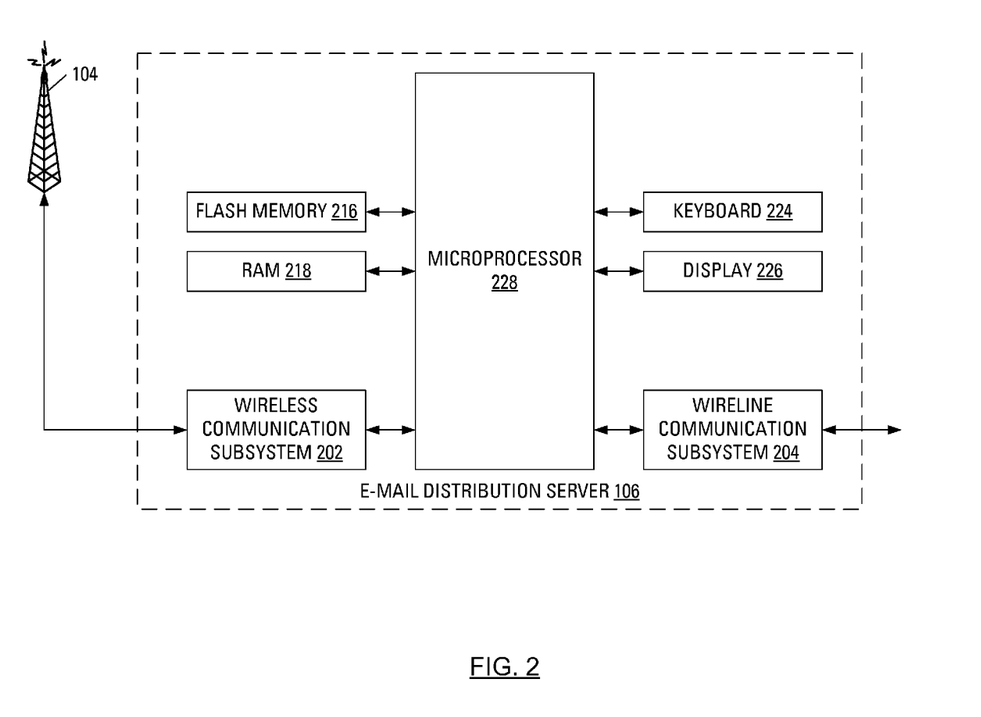
FIG. 2 schematically illustrates the e-mail distribution server of FIG. 1 according to one embodiment.

The e-mail distribution server 106 is illustrated in more detail in FIG. 2 as including an input device (a keyboard 224) and an output device (a display 226). A processing device (a microprocessor 228) is shown schematically in FIG. 2 as coupled to both the keyboard 224 and the display 226. The microprocessor 228 controls the operation of the display 226, as well as the overall operation of the e-mail distribution server 106, in part, responsive to actuation of keys on the keyboard 224 by a user.

In addition to the microprocessor 228, other parts of the e-mail distribution server 106 are shown schematically in FIG. 2. These include a wireless communications subsystem 202 and a wireline communications subsystem 204. Additionally, the e-mail distribution server 106 includes computer readable storage media in the form of memory devices such as a flash memory 216 and a Random Access Memory (RAM) 218. The e-mail distribution server 106 preferably has the capability to communicate with other computer systems via the wide area network 110.

Operating system software executed by the microprocessor 228 is preferably stored in a computer readable medium, such as the flash memory 216, but may be stored in other types of memory devices, such as a read only memory (ROM), persistent memory or similar storage element. In addition, system software and device-specific applications, or parts thereof, may be temporarily loaded into a volatile store, such as the RAM 218. Communication signals received by the e-mail distribution server 106 may also be stored to the RAM 218.

The microprocessor 228, in addition to its operating system functions, enables execution of software applications on the e-mail distribution server 106. A predetermined set of software applications may be installed on the e-mail distribution server 106.

In a known manner of operation, a user of the first mobile device 102A may configure the first mobile device 102A to poll the pull e-mail server 112 for new e-mail messages every 15 minutes. That is, the polling interval is 15 minutes. Over time, e-mail messages addressed to the user of the first mobile device 102A arrive at the pull e-mail server 112. The e-mail messages are stored at the pull e-mail server 112 until the first mobile device 102A polls the pull e-mail server 112, determines that new e-mail messages await and then retrieves the e-mail messages.

The e-mail distribution server 106, while typically associated with push-based e-mail systems, may be adapted to manage pull-based e-mail message distribution. As a result of the adaptation, the burden of polling the pull e-mail server 112, which is typically handled by the first mobile device 102A, is handled by the e-mail distribution server 106. That is, instead of the first mobile device 102A polling the pull e-mail server 112 at the end of each interval, the e-mail distribution server 106 polls the pull e-mail server 112 at the end of each interval. As such, when there is a new incoming e-mail message at the pull e-mail server 112, the e-mail distribution server 106 obtains the incoming e-mail message and transmits the incoming e-mail message over the wireless network 104 to the first mobile device 102A.

While this strategy reduces traffic over the wireless network 104, specifically, polling traffic between the first mobile device 102 and the pull e-mail server 112, the maximum time between arrival of a new e-mail message at the pull e-mail server 112 and the arrival of the same message at the first mobile device 102A is roughly equivalent to the polling interval.

Figure 3:
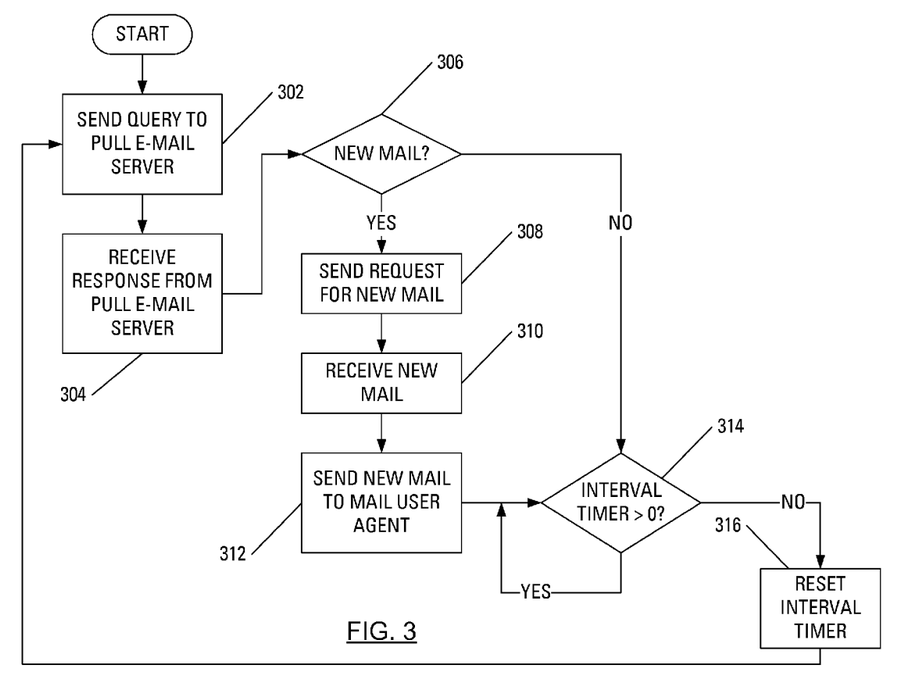
FIG. 3 illustrates steps in a known method of managing a pull e-mail account on behalf of a mobile communication device.
Figure 4:
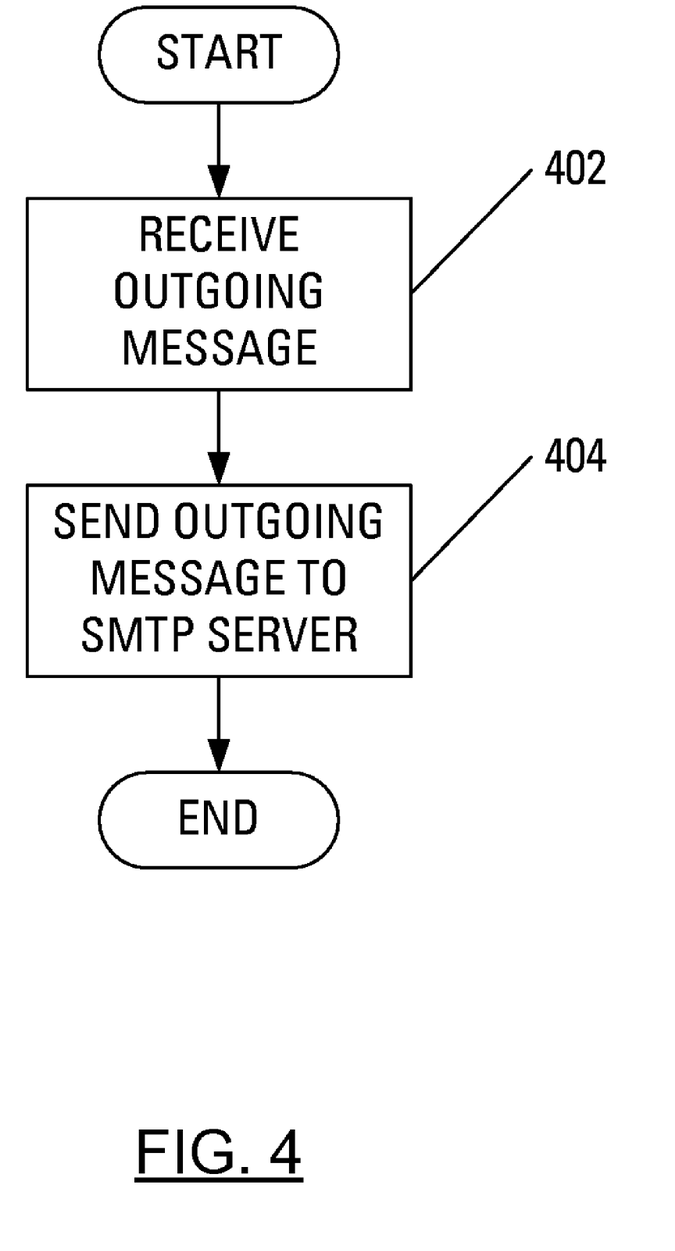
FIG. 4 illustrates steps in a known method of managing an outgoing e-mail message from a mobile communication device.

The following exemplary time-line includes references to FIGS. 3 and 4, which illustrate known methods carried out by the e-mail distribution server 106 to manage pull-based e-mail message distribution. As will be clear to a person of ordinary skill in the art, the e-mail distribution server 106 may execute the exemplary management method of FIG. 3 simultaneously for each of the pull e-mail accounts managed by the e-mail distribution server 106 and identified by a unique e-mail address.

09:55 AM

The e-mail distribution server 106 sends (step 302, FIG. 3) a query to the pull e-mail server 112 to determine whether new incoming e-mail messages have arrived for the address associated with the user of the first mobile device 102A.

The pull e-mail server 112 sends a response to the e-mail distribution server 106 indicating that no new incoming e-mail messages have arrived.

The e-mail distribution server 106 receives (step 304) the response from the pull e-mail server 112.

The e-mail distribution server 106 determines (step 306) that the response from the pull e-mail server 112 indicates that there is no new mail to be retrieved for the first mobile device 102A.

The e-mail distribution server 106 then determines (step 314), and continues to determine, that the interval timer still has some time remaining.

9:58 AM

A user of the second mobile device 102B composes and sends an outgoing e-mail message addressed to the user of the first mobile device 102A.

9:59 AM

The e-mail distribution server 106 receives (step 402, FIG. 4) the outgoing e-mail message and sends (step 404) the outgoing e-mail message to the SMTP server 108.

The SMTP server 108 receives the outgoing e-mail message and sends the outgoing e-mail message to the pull e-mail server 112.

10:00 AM

The outgoing e-mail message arrives at, and is stored by, the pull e-mail server 112. From the perspective of the mail user agent at the first mobile device 102A, the message is now a new incoming e-mail message.

10:10 AM

The e-mail distribution server 106 determines (step 314) that the interval timer has expired.

The e-mail distribution server 106 resets (step 316) the interval timer.

The e-mail distribution server 106 sends (step 302) a query to (i.e., polls) the pull e-mail server 112 to determine whether new e-mail messages have arrived for the address associated with the user of the first mobile device 102A.

The pull e-mail server 112 sends a response to the e-mail distribution server 106 indicating that new e-mail messages have arrived.

The e-mail distribution server 106 receives (step 304) the response from the pull e-mail server 112.

The e-mail distribution server 106 determines (step 306) that the response from the pull e-mail server 112 indicates that there is new mail to be retrieved for the first mobile device 102A.

The e-mail distribution server 106 sends a request (step 308) to the pull e-mail server 112 for the new e-mail messages.

The pull e-mail server 112 sends a response to the e-mail distribution server 106 including the new incoming e-mail message.

The e-mail distribution server 106 receives (step 310) the response from the pull e-mail server 112, which response includes the new incoming e-mail message.

The e-mail distribution server 106 sends (step 312) the incoming e-mail message to the mail user agent at the first mobile device 102A.

The mail user agent at the first mobile device 102A receives the incoming e-mail message from the e-mail distribution server 106.

The e-mail distribution server 106 then determines (step 314), and continues to determine, that the interval timer still has some time remaining.

End of Time Line

In overview, it is proposed herein to equip the e-mail distribution server 106 with an ability to recognize that a given e-mail message specifies, as one of the recipient addresses, an e-mail address for which the e-mail distribution server 106 manages pull-based e-mail message distribution. The e-mail distribution server 106 may then poll the pull e-mail server 112 associated with the e-mail address much sooner than it would have had the e-mail distribution server 106 waited until the expiry of the polling interval.

Figure 5:
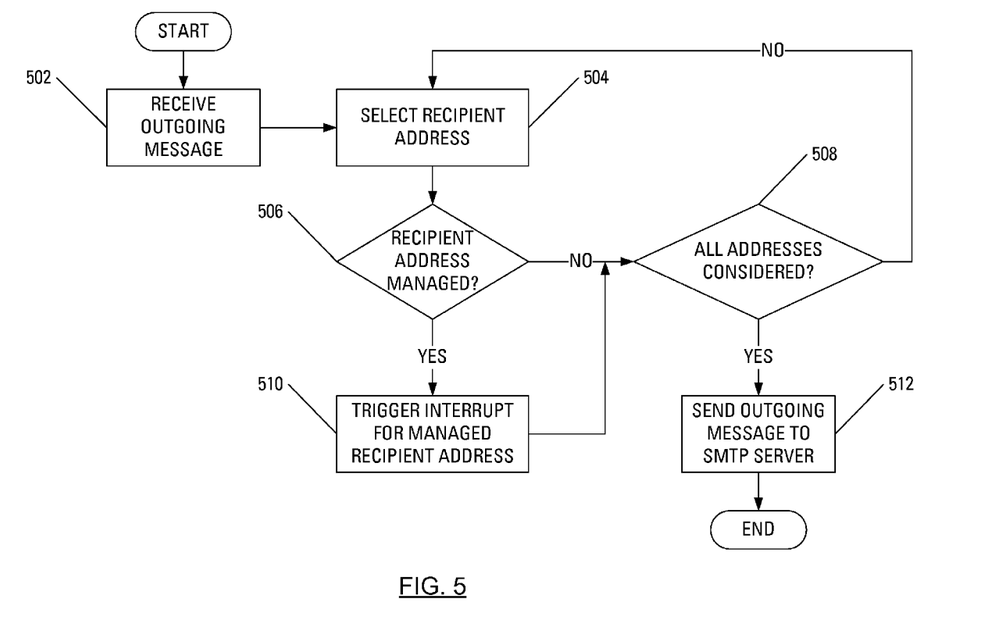
FIG. 5 illustrates steps in a novel method of managing an outgoing e-mail message from a mobile communication device according to one embodiment.

In particular, the known method of managing an outgoing e-mail message illustrated in FIG. 4 may be adapted as illustrated in FIG. 5. Central to the adaptation is the expectation that the e-mail distribution server 106 maintains a record of e-mail addresses of the pull e-mail accounts managed by the e-mail distribution server 106.

In short, the e-mail distribution server 106, upon receiving an e-mail message, considers the recipient addresses of the e-mail message. If the e-mail message includes an e-mail address identifying one of the pull e-mail accounts managed by the e-mail distribution server, the e-mail distribution server 106 interrupts the account-specific management method, as illustrated in the exemplary method of FIG. 6, to cause the e-mail distribution server 106 to poll the appropriate pull e-mail server.

Figure 6:
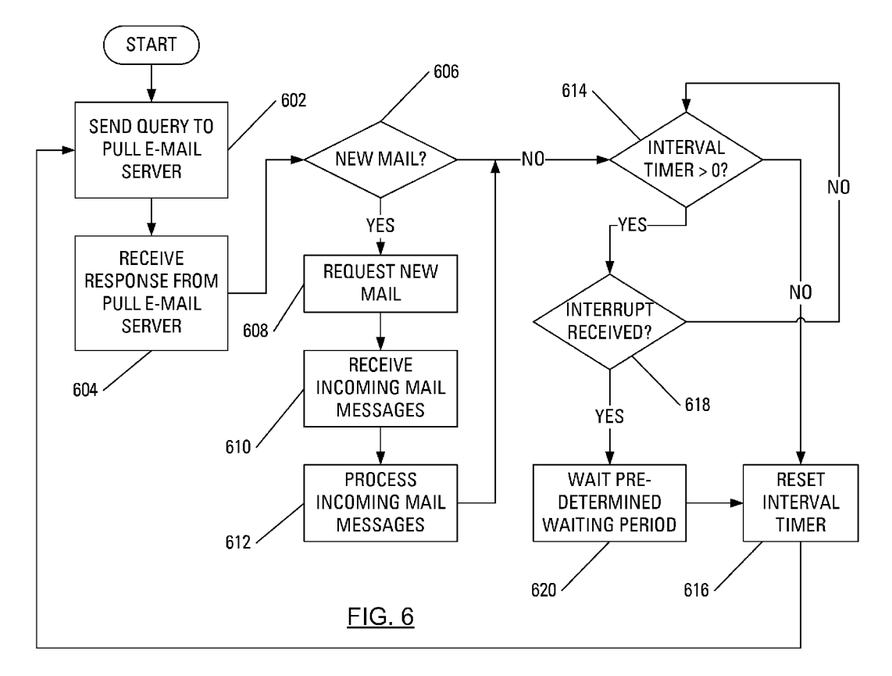
FIG. 6 illustrates steps in a novel method of managing a pull e-mail account on behalf of a mobile communication device according to one embodiment.

The following exemplary time-line includes references to FIGS. 5 and 6, which illustrate novel methods carried out by the e-mail distribution server 106 to manage pull-based e-mail message distribution. As will be clear to a person of ordinary skill in the art, the e-mail distribution server 106 may execute the exemplary management method of FIG. 3 simultaneously for each of the pull e-mail accounts managed by the e-mail distribution server 106 and identified by a unique e-mail address.

09:55 AM

The e-mail distribution server 106 sends (step 602, FIG. 6) a query to the pull e-mail server 112 to determine whether new e-mail messages have arrived for the address associated with the user of the first mobile device 102A.

The pull e-mail server 112 sends a response to the e-mail distribution server 106 indicating that no new e-mail messages have arrived.

The e-mail distribution server 106 receives (step 604) the response from the pull e-mail server 112.

The e-mail distribution server 106 determines (step 606) that the response from the pull e-mail server 112 indicates that there is no new mail to be retrieved for the first mobile device 102A.

The e-mail distribution server 106 then determines (step 614) that the interval timer still has some time remaining and also determines (step 618) that an interrupt has not been received. Such determining (steps 614 and 618) remains ongoing until the interval timer reaches zero, at which point the e-mail distribution server 106 determines (step 614) that the interval timer has no time remaining and resets (step 616) the interval timer before polling (step 602) the pull e-mail server 112.

9:58 AM

A user of the second mobile device 102B composes and sends an outgoing e-mail message addressed to the user of the first mobile device 102A.

9:59 AM

The e-mail distribution server 106 receives (step 502, FIG. 5) the outgoing e-mail message and considers whether the accounts of any of the recipients specified in the outgoing e-mail message are managed by the e-mail distribution server 106. In particular, the e-mail distribution server 106 selects (step 504) one of the e-mail addresses of the recipients specified by the outgoing e-mail message. By way of background, the e-mail distribution server 106 may, for instance, maintain a record that includes a plurality of e-mail addresses, where each e-mail address of the plurality of e-mail addresses is associated with a pull e-mail account managed by the e-mail distribution server 106. The e-mail distribution server 106 determines (step 506) whether a match for the selected e-mail address may be found among the plurality of e-mail addresses in the record.

Notably, the e-mail addresses of the recipients specified by the outgoing e-mail message may be found in more than one field of the outgoing e-mail message. That is, e-mail addresses of recipients may be specified in: a "TO" field; a Carbon Copy, or "CC", field; and a Blind Carbon Copy, or "BCC", field.

If the e-mail distribution server 106 determines (step 506) that the selected e-mail address is not associated with a pull e-mail account managed by the e-mail distribution server 106, the e-mail distribution server 106 then determines (step 508) whether there are further e-mail addresses to consider.

If the e-mail distribution server 106 determines (step 506) that the selected e-mail address is associated with a pull e-mail account managed by the e-mail distribution server 106, the e-mail distribution server 106 triggers (step 510) an interrupt of the pull e-mail management method that is specific to the pull e-mail account associated with the selected e-mail address. The e-mail distribution server 106 then determines (step 508) whether there are further e-mail addresses to consider.

If the e-mail distribution server 106 determines (step 508) that there are further e-mail addresses to consider, the process returns to step 504 and another e-mail address is selected from the list of recipients specified by the outgoing e-mail message.

Upon determining (step 508) that there are no further e-mail addresses to consider, the e-mail distribution server 106 sends (step 512) the outgoing e-mail message to the SMTP server 108.

The SMTP server 108 receives the outgoing e-mail message and sends the outgoing e-mail message to the pull e-mail server 112.

10:00 AM

The outgoing e-mail message arrives at, and is stored by, the pull e-mail server 112.

The e-mail distribution server 106 determines (step 618) that an interrupt has been received.

The e-mail distribution server 106 waits (step 620) a predetermined waiting period, e.g., zero, before proceeding to reset (step 616) the interval timer and then polling (step 602) the pull e-mail server 112.

The e-mail distribution server 106 sends (step 602) a query to the pull e-mail server 112 to determine whether new e-mail messages have arrived for the address associated with the user of the first mobile device 102A.

The pull e-mail server 112 sends a response to the e-mail distribution server 106 indicating that new e-mail messages have arrived.

The e-mail distribution server 106 receives (step 604) the response from the pull e-mail server 112.

The e-mail distribution server 106 determines (step 606) that the response from the pull e-mail server 112 indicates that there is new mail to be retrieved for the first mobile device 102A.

The e-mail distribution server 106 sends a request (step 608) to the pull e-mail server 112 for the new e-mail messages.

The pull e-mail server 112 sends a response to the e-mail distribution server 106 including the new e-mail messages among which is the formerly outgoing, now incoming, e-mail message.

The e-mail distribution server 106 receives (step 610) the response from the pull e-mail server 112, which response includes the incoming e-mail message.

Figure 7:
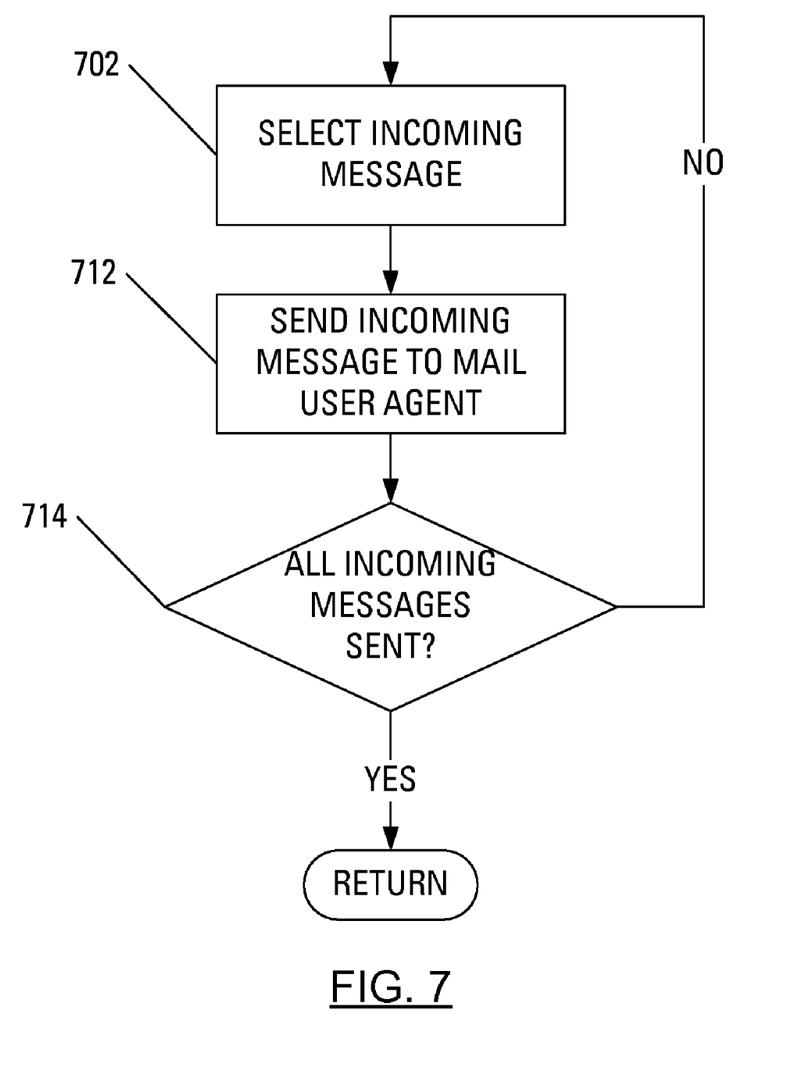
FIG. 7 illustrates steps in a known method of processing incoming e-mail messages.

The e-mail distribution server 106 processes (step 612) the new e-mail messages according to the processing steps of FIG. 7. In particular, the e-mail distribution server 106 selects (step 702) one of the new e-mail messages and sends (step 712) the selected new e-mail message to the corresponding mail user agent. The e-mail distribution server 106 then determines (step 714) whether all new messages have been sent to their corresponding mail user agents. In this way, the incoming e-mail message under consideration is selected (step 702) and sent (step 712) to the mail user agent at the first mobile device 102A.

If the e-mail distribution server 106 determines (step 714) that not all new messages have been sent to their corresponding mail user agents, the process returns to step 702 and a further new message is selected. If the e-mail distribution server 106 determines (step 714) that all new messages have been sent to their corresponding mail user agents, the process returns to the exemplary method of FIG. 6.

The mail user agent at the first mobile device 102A receives the incoming e-mail message from the e-mail distribution server 106.

The e-mail distribution server 106 then determines (step 614) that the interval timer still has some time remaining and also determines (step 618) that an interrupt has not been received. Such determining (steps 614 and 618) remains ongoing.

End of Time Line

Notably, in the exemplary time line related to the novel methods illustrated in FIGS. 5 and 6, the first mobile device 102A receives the outgoing e-mail message from the e-mail distribution server 106 shortly after 10:00 AM, approximately ten minutes earlier than in the exemplary time line related to the known methods illustrated in FIGS. 3 and 4. Furthermore, the delay between the arrival of the outgoing e-mail message at the pull e-mail server 112 and the arrival of the outgoing e-mail message at the first mobile device 102A is minimized by the novel methods illustrated in FIGS. 5 and 6 whereas, in the known methods illustrated in FIGS. 3 and 4, the delay may be as much as the entire duration of the polling interval.

Advantageously, the minimization of this delay may be perceived by the user of the first mobile device 102A as an improvement in quality of service offered by the service provider represented by the wireless carrier network 104 and the e-mail distribution server 106.

As will be understood by a person of ordinary skill in the art, even though the e-mail distribution server 106 may be executing methods of pull e-mail account management exemplary of the present application, the efficiency of delivery of e-mail messages having been sent in a manner that does not involve the e-mail distribution server 106 is unlikely to improve. For instance, an outgoing e-mail message from the PC 114 likely would not be received by the e-mail distribution server 106 on its way to the SMTP server 108. As such, the e-mail distribution server 106 would not have an opportunity to consider (step 504, FIG. 5) the recipient addresses and, subsequently, trigger an interrupt.

A careful review of FIGS. 5 and 6 in combination reveals that the e-mail distribution server 106 triggers (step 510) an interrupt of the pull e-mail management method that is specific to the pull e-mail account associated with a given e-mail address in an outgoing message. The triggering of the interrupt may lead to the sending (step 602) of a query to the associated pull e-mail server before the e-mail distribution server 106 sends (step 512) the outgoing message to the SMTP server, from which the outgoing e-mail message is sent to the associated pull e-mail server. Unfortunately, in such a case, the associated pull e-mail server is being queried before the e-mail message of interest has arrived at the associated pull e-mail server. As such, the benefit of recognizing that an outgoing e-mail message is to be expected at the associated pull e-mail server is lost.

Several solutions to reverse this loss of benefit may be considered. For instance, a predetermined waiting period, or delay, may put in place between the determination (step 618, FIG. 6) that an interrupt has been received and the resetting (step 616) of the interval timer. This predetermined waiting period may be implemented at step 620 and may be based on an average latency between the sending (step 512) of a given outgoing message to an SMTP server and the receipt (step 604) of a response from the associated pull e-mail server indicating that the given outgoing message has been received. The waiting period may, for instance, be selected from a range extending from five seconds to 50 seconds. In many cases, the receipt of the interrupt will lead to polling of the pull e-mail server sooner than would have been the case if the interval time was allowed to run down. However, it is possible that there will some cases in which the predetermined waiting period exceeds the current value of the interval timer. In the latter case, the receipt of the interrupt will lead to polling of the pull e-mail server later than would have been the case if the interval timer was allowed to run down.

A detailed discussion of the measurement of the latency is considered by the applicant to be within the scope of a person of ordinary skill in the art, but outside the scope of the present application.

Notably, methods of pull e-mail account management exemplary of the present application are not necessarily limited to consideration of outgoing e-mail messages. In a manner similar to the consideration of recipients of an outgoing e-mail message, the recipient list for an incoming e-mail message may be considered so that the presence of the same incoming e-mail message at other, managed pull e-mail servers may be anticipated.

Figure 8:
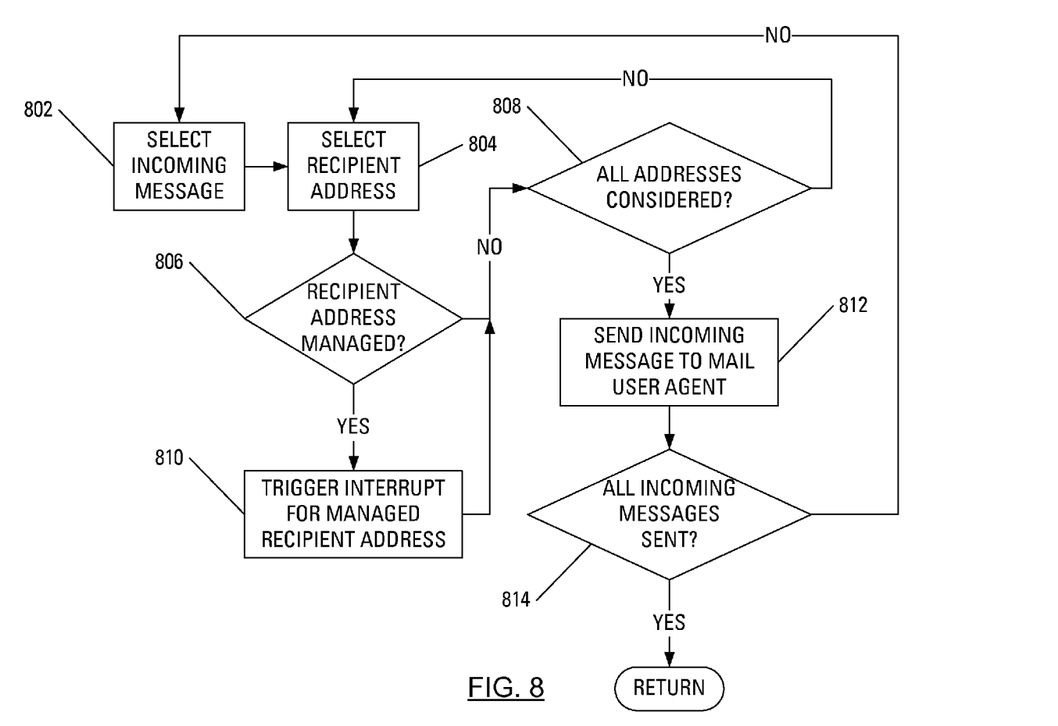
FIG. 8 illustrates steps in a novel method of processing incoming e-mail messages, according to one embodiment.

FIG. 8 illustrates steps of an exemplary method carried out by the e-mail distribution server 106 to process (step 612) new e-mail messages as an alternative to the processing steps of FIG. 7.

In particular, the e-mail distribution server 106 selects (step 802) one of the new e-mail messages and selects (step 804) one of the e-mail addresses of the recipients specified by the selected new e-mail message. The e-mail distribution server 106 determines (step 806) whether a match for the selected e-mail address may be found among the plurality of e-mail addresses in the record of e-mail addresses associated with managed pull e-mail accounts.

If the e-mail distribution server 106 determines (step 806) that the selected e-mail address is not associated with a pull e-mail account managed by the e-mail distribution server 106, the e-mail distribution server 106 then determines (step 808) whether there are further e-mail addresses to consider.

If the e-mail distribution server 106 determines (step 806) that the selected e-mail address is associated with a pull e-mail account managed by the e-mail distribution server 106, the e-mail distribution server 106 triggers (step 810) an interrupt of the pull e-mail management method that is specific to the pull e-mail account associated with the selected e-mail address. The e-mail distribution server 106 then determines (step 808) whether there are further e-mail addresses to consider.

If the e-mail distribution server 106 determines (step 808) that there are further e-mail addresses to consider, the process returns to step 804 and another e-mail address is selected from the list of recipients specified by the selected new e-mail message.

Upon determining (step 608) that there are no further e-mail addresses to consider, the e-mail distribution server 106 sends (step 812) the selected new e-mail message to the corresponding mail user agent. The e-mail distribution server 106 then determines (step 814) whether all new messages have been sent to their corresponding mail user agents.

If the e-mail distribution server 106 determines (step 814) that not all new messages have been sent to their corresponding mail user agents, the process returns to step 802 and a further new message is selected. If the e-mail distribution server 106 determines (step 814) that all new messages have been sent to their corresponding mail user agents, the process returns to the exemplary method of FIG. 6.

The applicants have recognized that one negative side effect of the methods of efficient polling proposed herein is potential enhancement of a denial-of-service (DoS) attack. In computer security, a DoS attack is an attempt to make a computer resource unavailable to its intended users. The triggering (step 510, FIG. 5) of an interrupt that leads to a higher frequency of sending of queries (step 602, FIG. 6) to a particular pull e-mail server might be exploited by a malicious user. To counter such maliciousness, the e-mail distribution server 106 may limit the number of queries sent to a particular pull e-mail server in a given period of time. The limit may, for example, be hard coded into the operating software of the e-mail distribution server 106. Alternatively, the limit may, for example, be set as a registry key value of a configuration value. Additionally, the limit may, for example, be determined as a quantity of queries known to be allowed based on historical data collected for the particular pull e-mail server.

A person of ordinary skill in the art will understand that, although the present application has been described in the context of a single e-mail distribution server 106, aspects of the methods proposed herein may be applicable to networks of e-mail distribution servers. Consider, for instance, a network of 500 e-mail distribution servers, each e-mail distribution server handling the pull e-mail accounts of 5,000 users. When the e-mail distribution server 106 determines whether a selected e-mail address has a match in a record of managed e-mail addresses, the record may associate an e-mail distribution server with an e-mail address, in addition to associating a pull e-mail server with the e-mail address. Consequently, when the e-mail distribution server 106 triggers (step 510) an interrupt, such triggering may involve transmitting a message to the e-mail distribution server at which pull e-mail services are managed for the selected e-mail address.

As will also be understood by a person of ordinary skill in the art, while novel methods have been disclosed herein in the context of providing service to mobile wireless communication devices, service to such devices is not essential to the operation of the e-mail distribution server 106. For instance, the mail user agents may be personal computers with physical network connections.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method of handling an e-mail message, said method comprising:
   managing, at a mail distribution server, a pull e-mail account for a first mail user agent, where said managing involves periodically polling a pull e-mail server to determine whether new e-mail messages have been received by said pull e-mail server, where said new e-mail messages specify an address associated with said pull e-mail account;
   receiving, at said mail distribution server, an e-mail message from a second mail user agent;
   determining, at said mail distribution server, said e-mail message specifies, as a recipient, said address associated with said pull e-mail account;
   responsive to determining said e-mail message specifies, as a recipient, said address associated with said pull e-mail account, triggering an interruption of said managing;
   responsive to said interruption, waiting a predetermined waiting period, wherein said predetermined waiting period is based on a measured network latency value; and
   responsive to expiration of said predetermined waiting period, polling said pull e-mail server.

2. The method of claim 1 wherein said first mail user agent is associated with a first mobile communication device.

3. The method of claim 2 wherein said second mail user agent is associated with a second mobile communication device.

4. The method of claim 1 further comprising, subsequent to said polling said pull e-mail server responsive to said interruption, receiving an indication, from said pull e-mail server, a new e-mail message has arrived.

5. The method of claim 4 further comprising:
   sending a request to said pull e-mail server to obtain said new e-mail message; and
   receiving a response to said request from said pull e-mail server, said response including said new e-mail message.

6. The method of claim 5 further comprising sending said new e-mail message to said first mail user agent.

7. A mail distribution server comprising a processor adapted to:
   manage a pull e-mail account for a first mail user agent, where said managing involves periodically polling a pull e-mail server to determine whether new e-mail messages have been received by said pull e-mail server, where said new e-mail messages specify an address associated with said pull e-mail account;
   receive an e-mail message from a second mail user agent;
   determine whether said e-mail message specifies, as a recipient, said address associated with said pull e-mail account;
   trigger an interruption of said managing, where said e-mail message specifies, as a recipient, said address associated with said pull e-mail account;
   wait a predetermined waiting period, wherein said predetermined waiting period is based on a measured network latency value; and
   poll, responsive to expiration of said predetermined waiting period, said pull e-mail server.

8. The mail distribution server of claim 7 wherein said processor is further adapted to:
   send a request to said pull e-mail server to obtain said new e-mail message; and
   receive a response to said request from said pull e-mail server, said response including said new e-mail message.

9. The mail distribution server of claim 8 wherein said processor is further adapted to send said new e-mail message to said first mail user agent.

10. A non-transitory computer readable storage medium containing computer-executable instructions, when performed by a processor, cause said processor to:
    manage a pull e-mail account for a first mail user agent, where said managing involves periodically polling a pull e-mail server to determine whether new e-mail messages have been received by said pull e-mail server, where said new e-mail messages specify an address associated with said pull e-mail account;
    receive an e-mail message from a second mail user agent;
    determine whether said e-mail message specifies, as a recipient, said address associated with said pull e-mail account;
    trigger an interruption of said managing, where said e-mail message specifies, as a recipient, said address associated with said pull e-mail account;
    wait a predetermined waiting period, wherein said predetermined waiting period is based on a measured network latency value; and
    responsive to expiration of said predetermined waiting period, poll said pull e-mail server.

11. A method of managing an incoming mail message, said method comprising:
    managing a first pull e-mail account for a first mail user agent, where said managing involves periodically polling a first pull e-mail server to determine whether new e-mail messages have been received by said first pull e-mail server, where said new e-mail messages specify an address associated with said first pull e-mail account;
    managing a second pull e-mail account for a second mail user agent, said second pull e-mail account associated with a second pull e-mail server;
    receiving, from said first pull e-mail server and responsive to said polling, an incoming e-mail message;
    determining whether said incoming e-mail message specifies, as a recipient, an address associated with said second pull e-mail account;
    where said incoming e-mail message specifies, as a recipient, said address associated with said second pull e-mail account, triggering an interruption of said managing said second pull e-mail account;
    responsive to said interruption, waiting a predetermined waiting period, wherein said predetermined waiting period is based on a measured network latency value; and responsive to expiration of said predetermined waiting period, polling said second pull e-mail server.

12. The method of claim 11 further comprising maintaining a record, said record including said address associated with said first pull e-mail account and said address associated with said second pull e-mail account.

13. The method of claim 11 further comprising, subsequent to said polling said pull e-mail server responsive to said interruption, receiving an indication, from said pull e-mail server, a new e-mail message has arrived.

14. The method of claim 13 further comprising:

sending a request to said pull e-mail server to obtain said new e-mail message; and receiving a response to said request from said pull e-mail server, said response including said new e-mail message.

* * * * *